US012614556B2

(12) United States Patent
Beack et al.

(10) Patent No.: US 12,614,556 B2
(45) Date of Patent: Apr. 28, 2026

(54) ENCODING METHOD, ENCODING DEVICE, DECODING METHOD, AND DECODING DEVICE USING SCALAR QUANTIZATION AND VECTOR QUANTIZATION

(71) Applicant: Electronics and Telecommunications Research Institute, Daejeon (KR)

(72) Inventors: Seung Kwon Beack, Daejeon (KR); Jongmo Sung, Daejeon (KR); Tae Jin Lee, Daejeon (KR); Woo-taek Lim, Daejeon (KR); Inseon Jang, Daejeon (KR); Byeongho Cho, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 608 days.

(21) Appl. No.: 18/102,472

(22) Filed: Jan. 27, 2023

(65) Prior Publication Data

US 2023/0245666 A1 Aug. 3, 2023

(30) Foreign Application Priority Data

Jan. 28, 2022 (KR) ........................ 10-2022-0013518

(51) Int. Cl.
*G10L 19/035* (2013.01)
*G10L 19/00* (2013.01)
*G10L 19/038* (2013.01)

(52) U.S. Cl.
CPC ........ *G10L 19/035* (2013.01); *G10L 19/0017* (2013.01); *G10L 19/038* (2013.01)

(58) Field of Classification Search
CPC . G10L 19/035; G10L 19/0017; G10L 19/038; G10L 19/0212; G10L 19/032
See application file for complete search history.

(56) References Cited

U.S. PATENT DOCUMENTS 7,599,833 B2 * 10/2009 Sung ..................... G10L 21/038 704/219
2006/0190247 A1 * 8/2006 Lindblom ............... H04S 3/008 704/230

(Continued)

FOREIGN PATENT DOCUMENTS

JP H11504733 A * 4/1999 ......... G10L 19/0212
KR 100348137 B1 11/2002
KR 20210133554 A * 11/2021 ........... G10L 19/032

OTHER PUBLICATIONS

Max Neuendorf et al., MPEG Unified Speech and Audio Coding—The ISO/MPEG Standard for High-Efficiency Audio Coding of all Content Types, Presented at the 132nd Convention, Apr. 26-29, 2012, Budapest, Hungary.

*Primary Examiner* — Anne L Thomas-Homescu
(74) *Attorney, Agent, or Firm* — WILLIAM PARK AND ASSOCIATES LTD.

(57) ABSTRACT

Provided are an encoding method, an encoding device, a decoding method, and a decoding device using a scalar quantization and a vector quantization. The encoding method includes converting an input signal of a time domain into a frequency domain, generating a first residual signal from an input signal of a frequency domain by using a scale factor, performing a scalar quantization of the first residual signal, generating a second residual signal from the scalar-quantized first residual signal, performing a lossless encoding of the scalar-quantized first residual signal, performing a vector quantization of the second residual signal, and transmitting a bitstream including the lossless-encoded first residual signal and the vector-quantized second residual signal.

6 Claims, 5 Drawing Sheets

(56) References Cited

U.S. PATENT DOCUMENTS

| | | | | |
|---|---|---|---|---|
| 2019/0333527 | A1* | 10/2019 | Shahbazi Mirzahasanloo | H04W 84/12 |
| 2019/0341064 | A1* | 11/2019 | Shahbazi Mirzahasanloo | H04W 84/12 |
| 2019/0392845 | A1* | 12/2019 | Peters | H04R 5/04 |
| 2019/0392846 | A1* | 12/2019 | Kim | G10L 19/008 |
| 2020/0013414 | A1* | 1/2020 | Thagadur Shivappa | G10L 19/008 |
| 2020/0013426 | A1* | 1/2020 | Sen | H04L 65/80 |
| 2020/0402519 | A1* | 12/2020 | Olivieri | H04S 7/30 |
| 2020/0402521 | A1* | 12/2020 | Olivieri | G10L 25/48 |
| 2020/0402522 | A1* | 12/2020 | Olivieri | G10L 19/167 |
| 2020/0402523 | A1* | 12/2020 | Olivieri | H04L 65/612 |
| 2020/0402529 | A1* | 12/2020 | Olivieri | H04L 65/756 |
| 2021/0174815 | A1 | 6/2021 | Beack et al. | |
| 2021/0390967 | A1 | 12/2021 | Beack et al. | |
| 2021/0398547 | A1* | 12/2021 | Beack | G10L 19/06 |
| 2022/0020385 | A1* | 1/2022 | Beack | G10L 19/06 |

* cited by examiner

ENCODING METHOD, ENCODING DEVICE, DECODING METHOD, AND DECODING DEVICE USING SCALAR QUANTIZATION AND VECTOR QUANTIZATION

CROSS-REFERENCE TO RELATED APPLICATION

This application claims the benefit of Korean Patent Application No. 10-2022-0013518 filed on Jan. 28, 2022, in the Korean Intellectual Property Office, the entire disclosure of which is incorporated herein by reference for all purposes.

BACKGROUND

Description of the Related Art

Effectively reducing an amount of audio information in a process of encoding an audio signal is necessary. A quantization method has been proposed as a method of reducing the amount of audio information, but there are difficulties in effectively reducing the amount of audio information with existing quantization methods.

Therefore, a method of effectively reducing the amount of audio information through the quantization of an audio signal is required.

SUMMARY

Embodiments provide a method and a device for efficiently encoding an input signal by applying both scalar quantization and vector quantization.

According to an aspect, there is provided an encoding method including converting an input signal of a time domain into a frequency domain, generating a first residual signal from an input signal of a frequency domain by using a scale factor, performing a scalar quantization of the first residual signal, generating a second residual signal from the scalar-quantized first residual signal, performing a lossless encoding of the scalar-quantized first residual signal, performing a vector quantization of the second residual signal, and transmitting a bitstream including the lossless-encoded first residual signal and the vector-quantized second residual signal.

The scale factor may be generated in every sub-band unit of a frequency domain allocated nonlinearly to the input signal converted into the frequency domain.

The first residual signal may be generated by applying a scale factor corresponding to each sample to the input signal.

The performing of the scalar quantization may include applying a roundoff operation to the first residual signal.

The scale factor may be derived based on a psychoacoustic linear prediction model.

The performing of the vector quantization may include processing the second residual signal as a vector based on a table, which is expressible in a fixed bitrate.

The generating of the second residual signal may include generating a second residual signal by using the first residual signal generated based on the scale factor and a result of applying a scalar quantization to the first residual signal.

According to an aspect, there is provided a decoding method including receiving a bitstream including a first residual signal and a second residual signal, performing a lossless decoding of the first residual signal included in the bitstream, performing a scalar dequantization of the first residual signal, performing a vector dequantization of the second residual signal, reconstructing the second residual signal, generating an output signal by applying a scale factor to a final residual signal, which is based on the first residual signal and the second residual signal, and converting the output signal from a frequency domain into a time domain.

The performing of the scalar dequantization may include performing a scalar dequantization of a first residual signal to which a scalar quantization, derived through a roundoff operation, is applied.

The performing of the vector dequantization may include processing the second residual signal as a vector based on a table, which is expressible in a fixed bitrate.

The scale factor may be derived based on a psychoacoustic linear prediction model.

According to an aspect, there is provided an encoding device including a processor. The processor may be configured to convert an input signal of a time domain into a frequency domain, generate a first residual signal from an input signal of a frequency domain by using a scale factor, perform a scalar quantization of the first residual signal, generate a second residual signal from the scalar-quantized first residual signal, perform a lossless encoding of the scalar-quantized first residual signal, perform a vector quantization of the second residual signal, and transmit a bitstream including the lossless-encoded first residual signal and the vector-quantized second residual signal.

The scale factor may be generated in every sub-band unit of a frequency domain allocated nonlinearly to the input signal converted into the frequency domain.

The first residual signal may be generated by applying a scale factor corresponding to each sample to the input signal.

The processor may be configured to perform a scalar quantization of the first residual signal by applying a roundoff operation to the first residual signal.

The scale factor may be derived based on a psychoacoustic linear prediction model.

The processor may be configured to perform a vector quantization, which processes the second residual signal as a vector based on a table, which is expressible in a fixed bitrate.

The processor may be configured to generate a second residual signal by using the first residual signal generated based on the scale factor and a result of applying a scalar quantization to the first residual signal.

Additional aspects of embodiments will be set forth in part in the description which follows and, in part, will be apparent from the description, or may be learned by practice of the disclosure.

According to embodiments, it is possible to efficiently encode an input signal by applying both scalar quantization and vector quantization.

BRIEF DESCRIPTION OF THE DRAWINGS

These and/or other aspects, features, and advantages of the invention will become apparent and more readily appreciated from the following description of embodiments, taken in conjunction with the accompanying drawings of which.

DETAILED DESCRIPTION

Figure 1:
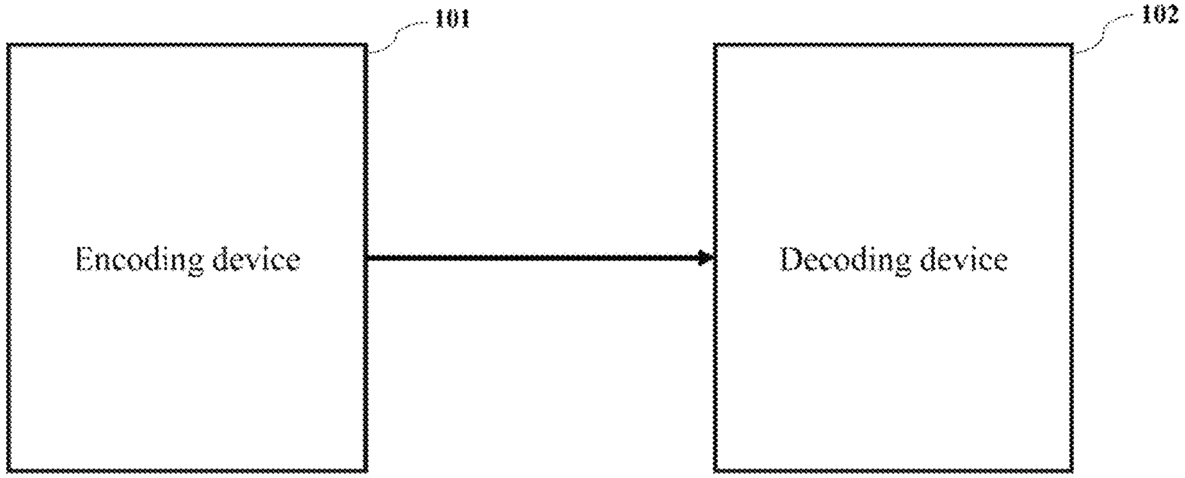
FIG. 1 is a diagram illustrating an encoding device and a decoding device according to an embodiment.

Hereinafter, embodiments will be described in detail with reference to the accompanying drawings. The scope of the right, however, should not be construed as limited to the embodiments set forth herein. In the drawings, like reference numerals are used for like elements.

Various modifications may be made to the embodiments. Here, the embodiments are not construed as limited to the disclosure and should be understood to include all changes, equivalents, and replacements within the idea and the technical scope of the disclosure.

Although terms of "first" or "second" are used to explain various components, the components are not limited to the terms. These terms should be used only to distinguish one component from another component. For example, a first component may be referred to as a second component, and similarly the second component may also be referred to as the first component.

The terminology used herein is for the purpose of describing particular embodiments only and is not to be limiting of the embodiments. As used herein, the singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms including technical and scientific terms used herein have the same meaning as commonly understood by one of ordinary skill in the art to which embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

When describing the embodiments with reference to the accompanying drawings, like reference numerals refer to like constituent elements and a repeated description related thereto will be omitted. In the description of embodiments, detailed description of well-known related structures or functions will be omitted when it is deemed that such description will cause ambiguous interpretation of the present disclosure.

Hereinafter, embodiments will be described in detail with reference to the accompanying drawings.

FIG. 1 is a diagram illustrating an encoding device and a decoding device according to an embodiment.

Referring to FIG. 1, an encoding device 101 may output a bitstream by encoding an audio signal or a voice signal, which are input signals. A decoding device 102 may reconstruct an original input signal by decoding an audio signal or a voice signal extracted from the bitstream.

The present invention proposes an encoding method capable of reducing sound quality distortion while providing higher encoding efficiency in an encoding process of an audio signal. According to an embodiment of the present invention, a method of effectively reducing an amount of information by applying both scalar quantization and vector quantization in an encoding process of the encoding device 101 is proposed. In addition, a method of reconstructing the amount of information reduced in the encoding process by applying both scalar dequantization and vector dequantization in a decoding process of the decoding device 102 is proposed.

Figure 2:
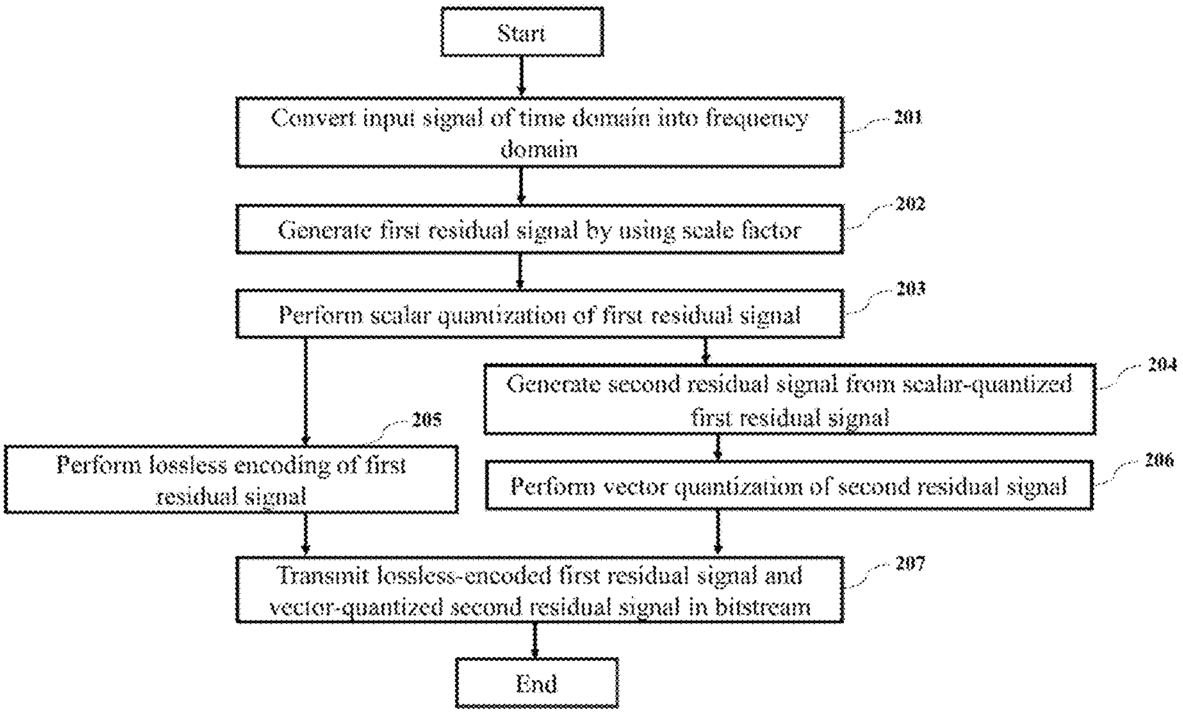
FIG. 2 is a flowchart illustrating an encoding process using scalar quantization and vector quantization according to an embodiment.

FIG. 2 is a flowchart illustrating an encoding process using scalar quantization and vector quantization according to an embodiment.

Referring to FIG. 2, in operation 201, an encoding device 101 may convert an input signal of a time domain into a frequency domain. Here, the input signal may have a feature of an audio signal or a voice signal.

The input signal is converted into the frequency domain to use a psychoacoustic model, to reduce the amount of information in the input signal. When a psychoacoustic model is used, analysis of each nonlinear band in a frequency domain may be possible.

The input signal may be divided into a unit of frames, and the input signal divided into the unit of frames may be converted into a frequency domain. For example, for the conversion of an input signal to a frequency domain, data compression efficiency may be improved by applying a modified discrete cosine transform (MDCT) method.

A psychoacoustic model may also be analyzed in a frequency domain. A psychoacoustic model may determine a quantization noise level by considering auditory features of each frame of an input signal. To reflect the quantization noise level in a quantization process, a scale factor capable of generating quantization noise may be derived as an analysis result of the psychoacoustic model. A scale factor may be generated for every sub-band of a frequency domain allocated nonlinearly to an input signal.

In operation 202, the encoding device 101 may generate a first residual signal by using the scale factor. A first residual signal of each sub-band using a scale factor may be derived according to Equation 1 below.

$$res_b(k)=(x_b(k)/sf_b(k))^{\gamma} \quad \text{[Equation 1]}$$

In Equation 1, b denotes a frame index of an input signal (audio signal) and k denotes a sample index. $x_b(k)$ denotes a frame signal of an input signal and $sf_b(k)$ denotes a scale factor corresponding to each sample. γ denotes a wapping factor, a factor for wapping a size of a final output signal. $res_b(k)$ denotes a first residual signal derived by applying a scale factor.

In operation 203, the encoding device 101 may perform scalar quantization of a first residual signal. Scalar quantization refers to a process of converting a first residual signal ($res_b(k)$) into an integer and may be performed according to Equation 2 below.

$$\widehat{res}_b(k)=\text{floor}(res_b(k)+\delta)^{\gamma} \quad \text{[Equation 2]}$$

In Equation 2, floor denotes a roundoff operation (⌈ ⌉) for representing a first residual signal in an integer and δ denotes a number in which δ≤0.5.

In operation 204, the encoding device 101 may generate a second residual signal from a scalar-quantized first residual signal. The encoding device 101 may generate a second residual signal by using a first residual signal derived by applying a scale factor and a scalar quantization signal. A process of generating a second residual signal may be performed by Equation 3 below.

$$res\_vq_b(k)=g_{vq}\cdot\text{dist}\{\widehat{res}_b(k),res_b(k)\} \quad \text{[Equation 3]}$$

Equation 3 shows a process of generating a second residual signal before performing vector quantization. $\widehat{res}_b$ (k),$res_b$(k) may be used to generate a second residual signal.

The process of generating a second residual signal for vector quantization may be performed through an operation (dist{ }) of a difference of a distance between a first residual signal and a result of performing scalar quantization of a first residual signal to which a scale factor is applied. The difference of the distance may be determined as a difference of the distance between a first residual signal and a result of performing scalar quantization of the first residual signal.

$g_{vq}$ denotes a global scale factor for adjusting normalization and a dynamic range before adjusting vector quantization. A global scale factor may be derived by simply normalizing with a minimum value/maximum value or normalizing a distribution of a difference of the distance.

In operation 205, the encoding device 101 may perform lossless encoding of a result of applying scalar quantization to a first residual signal.

In operation 206, the encoding device 101 may perform vector quantization of a second residual signal. For vector quantization, $res_{vq_b}$(k), a second residual signal, may be used as a vector string for matching to a codebook vector string for codebook retrieval necessary for vector quantization. A vector string of an input signal for matching to a codebook vector string may be defined as shown in Equation 4.

$$res_{vq_b}(c)=[res_{vq_b}(k-c\cdot B_c+1), res_{vq_b}(k-c\cdot B_c+2), \ldots, res_{vq_b}(k-(c-1)\cdot B_c)]^T \quad \text{[Equation 4]}$$

In Equation 4, a c-th codebook vector string may be configured with a vector string having $B_c$ number of elements. Index c denotes a number of times a frame is divided into sub-vector strings to perform vector quantization of one frame. For example, when dividing an N number of frame samples of an input signal into C number of sub-vector strings, c may be defined as $$B_c = \left\lceil \frac{N}{C} \right\rceil (1 \le c \le C).$$

In operation 207, the encoding device 101 may generate a bitstream including a lossless-encoded first residual signal and a vector-quantized second residual signal to transmit the bitstream to the decoding device 102. Lossless encoding is a process in which integer data is converted into bit strings by performing entropy encoding, and the bit strings from conversion are actually transmitted data.

Figure 3:
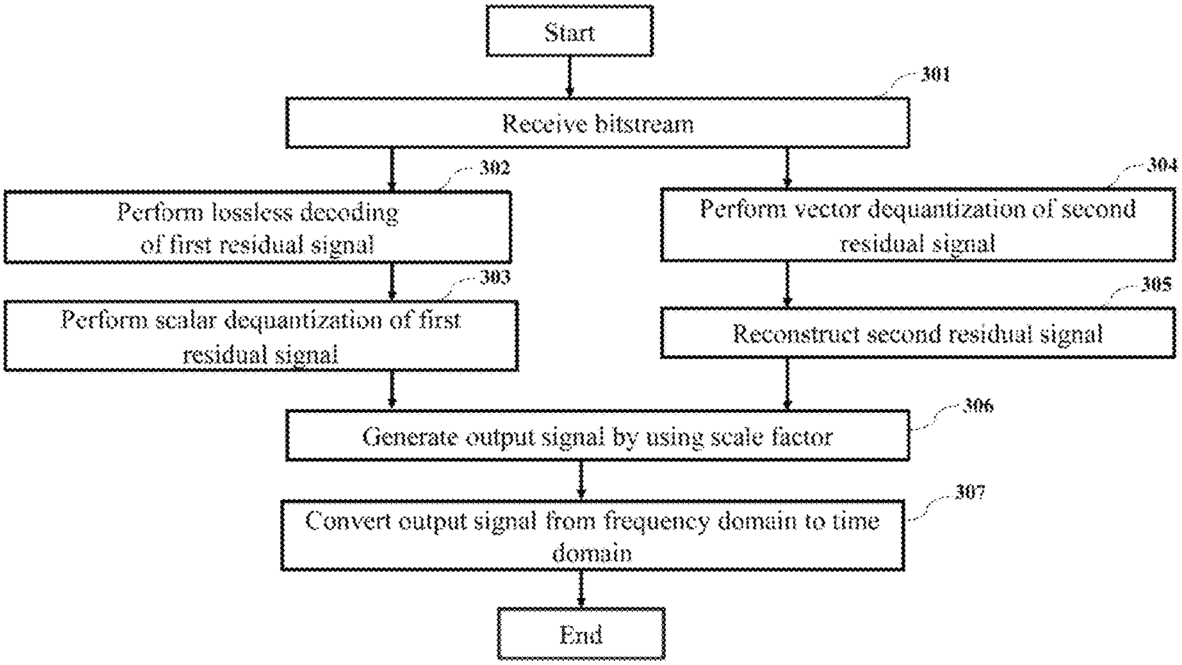
FIG. 3 is a flowchart illustrating a decoding process using scalar dequantization and vector dequantization according to an embodiment.

FIG. 3 is a flowchart illustrating a decoding process using scalar dequantization and vector dequantization according to an embodiment.

In operation 301, the decoding device 102 may receive a bitstream from the encoding device 101.

In operation 302, the decoding device 102 may perform lossless decoding of a first residual signal included in the bitstream.

In operation 303, the decoding device 102 may perform scalar dequantization of a second residual signal included in the bitstream.

In operation 304, the decoding device 102 may perform vector dequantization of the first residual signal.

In operation 305, the decoding device 102 may reconstruct the vector-dequantized second residual signal. In a reconstruction process of the second residual signal, the second residual signal may be reconstructed by performing vector dequantization from quantization index information included in a table about vector quantization. For example, when vector dequantization in a table form is performed in an encoding process, the decoding device 102 may reconstruct a table vector string from table index information transmitted from the encoding device 101 as a second residual signal. In addition, when vector quantization is performed in an algebraic method in an encoding process, the decoding device 102 may reconstruct a second residual signal through an arithmetic method, which is an inverse process of an algebraic method.

In operation 306, the decoding device 102 may generate an output signal by applying a scale factor to the first residual signal derived through scalar dequantization and the second residual signal derived through vector dequantization.

When $\widehat{res}_b$ (k), a first residual signal, is derived through the scalar dequantization of operation 304, the decoding device 102 may, according to the "dist" method of the encoding process of Equation 3, derive a second residual signal $\widehat{res\_vq}_b$ (k) through an inverse process of the "dist" method. For example, when the "dist" operation method is a differential method, the decoding device 102 may obtain a final residual signal $\widetilde{\widehat{res}}_b$ (k) by adding the second residual signal $\widehat{res\_vq}_b$ (k) to the first residual signal $\widehat{res}_b$ (k). The decoding device 102 may derive the final output signal $\widehat{x}_b$ (k) by applying the final residual signal $\widetilde{\widehat{res}}_b$ (k) and the scale factor to the inverse process of Equation 1.

In operation 307, the decoding device 102 may convert the output signal from a frequency domain to a time domain.

Figure 4:
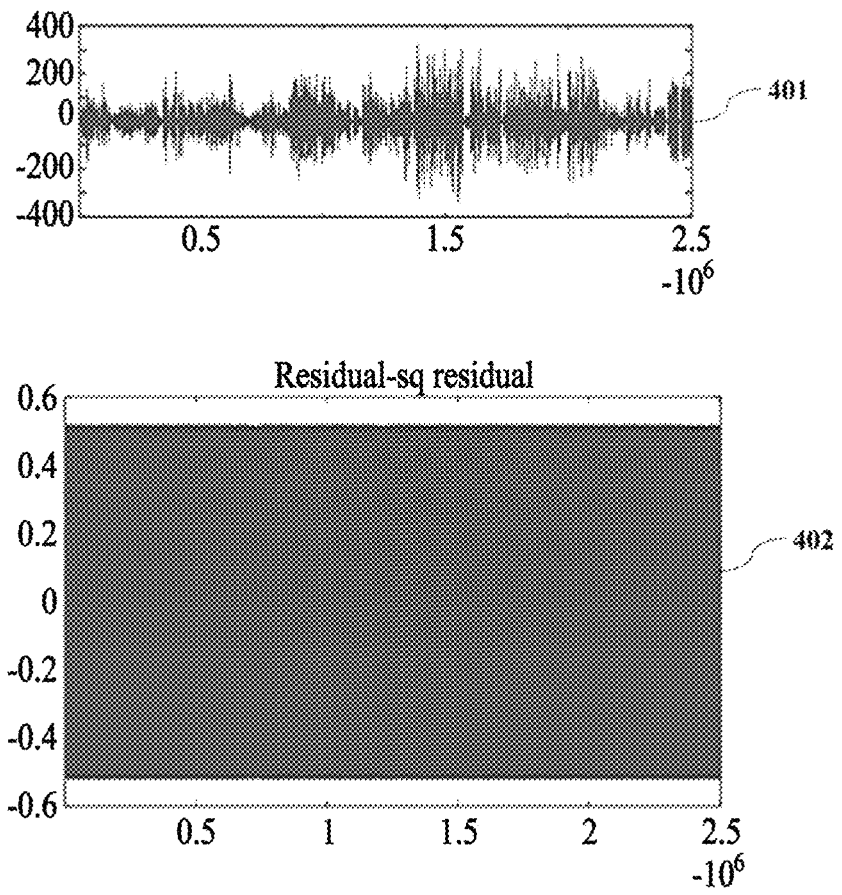
FIG. 4 is a diagram illustrating an example of a first residual signal and a second residual signal according to an embodiment.

FIG. 4 is a diagram illustrating an example of a first residual signal and a second residual signal according to an embodiment.

In the present invention, scalar quantization and vector quantization may both be applied to encode any one frame of a plurality of frames configuring an input signal. According to an embodiment of the present invention, the encoding device 101 may set an error signal about scalar quantization as a second residual signal to express the second residual signal as a signal having a statistical feature suitable to be applied with vector quantization.

When a scale factor is applied as shown in a first residual signal 401 of FIG. 4, it is not appropriate to process vector quantization. Therefore, vector quantization may be applied effectively when an entire band has a noise distribution as shown in a second residual signal 402. The second residual signal 402 may have a uniform(-like) distribution, which is a noise distribution, in a predetermined dynamic range.

Figure 5:
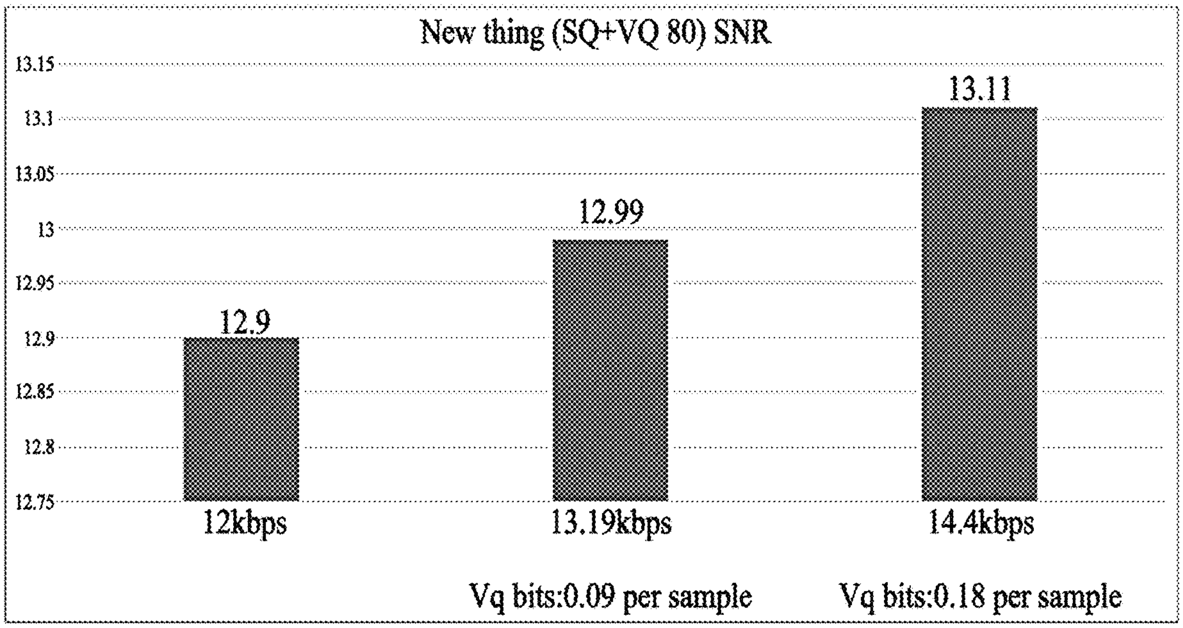
FIG. 5 is a diagram illustrating an enhanced performance result according to an embodiment.

FIG. 5 is a diagram illustrating an enhanced performance result according to an embodiment.

Referring to FIG. 5, a signal-to-noise ratio (SNR) graph, which compares a case in which encoding based on a scale factor is applied and a case in which a quantization bit of vector quantization of a second residual signal is added as in the present invention, is illustrated.

According to an embodiment of the present invention, a first residual signal may be generated based on a scale factor and a second residual signal may be generated based on a result of applying scalar quantization to the first residual signal. In addition, vector quantization may be applied to the second residual signal. That is, according to an embodiment of the present invention, an audio signal or a voice signal, which are input signals, may be efficiently encoded by applying both scalar quantization and vector quantization.

The components described in the embodiments may be implemented by hardware components including, for example, at least one digital signal processor (DSP), a processor, a controller, an application-specific integrated circuit (ASIC), a programmable logic element, such as a field programmable gate array (FPGA), other electronic devices, or combinations thereof. At least some of the functions or the processes described in the embodiments may be implemented by software, and the software may be recorded on a recording medium. The components, the functions, and the processes described in the embodiments may be implemented by a combination of hardware and software.

The method according to embodiments may be written in a computer-executable program and may be implemented as various recording media such as magnetic storage media, optical reading media, or digital storage media.

Various techniques described herein may be implemented in digital electronic circuitry, computer hardware, firmware, software, or combinations thereof. The implementations may be achieved as a computer program product, i.e., a computer program tangibly embodied in an information carrier, e.g., in a machine-readable storage device (for example, a computer-readable medium) or in a propagated signal, for processing by, or to control an operation of, a data processing apparatus, e.g., a programmable processor, a computer, or multiple computers. A computer program, such as the computer program(s) described above, may be written in any form of a programming language, including compiled or interpreted languages, and may be deployed in any form, including as a stand-alone program or as a module, a component, a subroutine, or other units suitable for use in a computing environment. A computer program may be deployed to be processed on one computer or multiple computers at one site or distributed across multiple sites and interconnected by a communication network.

Processors suitable for processing of a computer program include, by way of example, both general and special purpose microprocessors, and any one or more processors of any kind of digital computer. Generally, a processor will receive instructions and data from a read-only memory or a random-access memory, or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Examples of information carriers suitable for embodying computer program instructions and data include semiconductive wire memory devices, e.g., magnetic media such as hard disks, floppy disks, and magnetic tape, optical media such as compact disk read only memory (CD-ROM) or digital video disks (DVDs), magneto-optical media such as floptical disks, read-only memory (ROM), random-access memory (RAM), flash memory, erasable programmable ROM (EPROM), or electrically erasable programmable ROM (EEPROM). The processor and the memory may be supplemented by, or incorporated in special purpose logic circuitry.

In addition, non-transitory computer-readable media may be any available media that may be accessed by a computer and may include both computer storage media and transmission media.

Although the present specification includes details of a plurality of specific embodiments, the details should not be construed as limiting any invention or a scope that can be claimed, but rather should be construed as being descriptions of features that may be peculiar to specific embodiments of specific inventions. Specific features described in the present specification in the context of individual embodiments may be combined and implemented in a single embodiment. On the contrary, various features described in the context of a single embodiment may be implemented in a plurality of embodiments individually or in any appropriate sub-combination. Furthermore, although features may operate in a specific combination and may be initially depicted as being claimed, one or more features of a claimed combination may be excluded from the combination in some cases, and the claimed combination may be changed into a sub-combination or a modification of the sub-combination.

Likewise, although operations are depicted in a specific order in the drawings, it should not be understood that the operations must be performed in the depicted specific order or sequential order or all the shown operations must be performed in order to obtain a preferred result. In specific cases, multitasking and parallel processing may be advantageous. In addition, it should not be understood that the separation of various device components of the aforementioned embodiments is required for all the embodiments, and it should be understood that the aforementioned program components and apparatuses may be integrated into a single software product or packaged into multiple software products.

The embodiments disclosed in the present specification and the drawings are intended merely to present specific examples in order to aid in understanding of the present disclosure, but are not intended to limit the scope of the present disclosure. It will be apparent to those skilled in the art that various modifications based on the technical spirit of the present disclosure, as well as the disclosed embodiments, can be made.

What is claimed is:

1. An encoding method comprising:

converting an input signal of a time domain into a frequency domain;

generating a first residual signal by applying a scale factor corresponding to each sample to an input signal of a frequency domain;

performing a scalar quantization by applying a roundoff operation to the first residual signal;

generating a second residual signal by using the first residual signal generated based on the scale factor and the scalar-quantized first residual signal;

performing a lossless encoding of the scalar-quantized first residual signal;

performing a vector quantization of processing the second residual signal as a vector based on a table, which is expressible in a fixed bitrate; and transmitting a bitstream comprising the lossless-encoded first residual signal and the vector-quantized second residual signal, wherein the scale factor is generated in every sub-band unit of a frequency domain allocated nonlinearly to the input signal converted into the frequency domain.

2. The encoding method of claim 1, wherein the scale factor is derived based on a psychoacoustic linear prediction model.

3. A decoding method comprising:

receiving a bitstream comprising a first residual signal and a second residual signal;

performing a lossless decoding of the first residual signal included in the bitstream;

performing a scalar dequantization of the first residual signal to which a scalar quantization, derived through a roundoff operation, is applied;

performing a vector dequantization of processing the second residual signal as a vector based on a table, which is expressible in a fixed bitrate;

reconstructing the second residual signal;

generating an output signal by applying a scale factor to a final residual signal, which is based on the first residual signal and the second residual signal; and converting the output signal from a frequency domain into a time domain.

4. The decoding method of claim 3, wherein the scale factor is derived based on a psychoacoustic linear prediction model.

5. An encoding device comprising a processor, wherein the processor is configured to:

convert an input signal of a time domain into a frequency domain;

generate a first residual signal by applying a scale factor corresponding to each sample to an input signal of a frequency domain;

perform a scalar quantization by applying a roundoff operation to the first residual signal;

generate a second residual signal by using the first residual signal generated based on the scale factor and the scalar-quantized first residual signal;

perform a lossless encoding of the scalar-quantized first residual signal;

perform a vector quantization of processing the second residual signal as a vector based on a table, which is expressible in a fixed bitrate; and transmit a bitstream comprising the lossless-encoded first residual signal and the vector-quantized second residual signal, wherein the scale factor is generated in every sub-band unit of a frequency domain allocated nonlinearly to the input signal converted into the frequency domain.

6. The encoding device of claim 5, wherein the scale factor is derived based on a psychoacoustic linear prediction model.

* * * * *